(12) United States Patent
Baranowski et al.

(10) Patent No.: US 10,611,318 B2
(45) Date of Patent: Apr. 7, 2020

(54) VEHICLE COMPONENT WITH A MOUNTING COMPONENT FOR ATTACHMENT OF A FUNCTIONAL COMPONENT

(71) Applicant: FORD GLOBAL TECHNOLOGIES, LLC, Dearborn, MI (US)

(72) Inventors: Thomas Baranowski, Würselen (DE); Maik Broda, Würselen (DE); Florian Golm, Herzogenrath (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 463 days.

(21) Appl. No.: 15/421,908

(22) Filed: Feb. 1, 2017

(65) Prior Publication Data

US 2017/0246994 A1 Aug. 31, 2017

(30) Foreign Application Priority Data

Feb. 29, 2016 (DE) .................. 10 2016 203 215

(51) Int. Cl.
*F16B 37/04* (2006.01)
*B60R 13/02* (2006.01)

(52) U.S. Cl.
CPC .......... *B60R 13/02* (2013.01); *B60R 13/0206* (2013.01); *B60R 2013/0287* (2013.01)

(58) Field of Classification Search
CPC .............. Y10T 403/47; Y10T 403/471; Y10T 403/472; Y10T 403/473; Y10T 403/475; Y10T 24/406; Y10T 24/4088; F16B 37/04; B60R 13/0838; B60R 2011/0038
See application file for complete search history.

(56) References Cited

U.S. PATENT DOCUMENTS

| | | | | |
|---|---|---|---|---|
| 2,084,412 A | * | 6/1937 | Schaefer | B21D 53/36 24/186 |
| 4,792,475 A | * | 12/1988 | Bien | F16B 5/02 403/408.1 |
| 6,205,626 B1 | | 3/2001 | Watanabe et al. | |
| 6,209,909 B1 | * | 4/2001 | Breed | B60R 21/01534 280/729 |

(Continued)

FOREIGN PATENT DOCUMENTS

DE 10 2012 005 739 * 9/2013 ............ B29C 45/14
EP 332495 B1 9/1989
(Continued)

OTHER PUBLICATIONS

Translation of EP 1 197 316. worldwide.espacenet.com. Apr. 27, 2019.*

(Continued)

*Primary Examiner* — Michael P Ferguson
(74) *Attorney, Agent, or Firm* — Carlson, Gaskey & Olds

(57) ABSTRACT

This document relates to a vehicle component with a mounting element to which a functional component can be attached. The mounting element has a reception region and a connection region. The reception region is formed to attach the functional component, while the connection region is attached via a fiber band to the vehicle component. The fiber band may be connected to the vehicle component by overmolding, the reception region being at least partially excluded from this overmolding.

10 Claims, 6 Drawing Sheets

(56) References Cited

U.S. PATENT DOCUMENTS

| | | | | |
|---|---|---|---|---|
| 6,612,256 | B1* | 9/2003 | Martin | B63B 17/02 |
| | | | | 114/360 |
| 7,475,453 | B2* | 1/2009 | Drake | A44B 11/04 |
| | | | | 24/324 |
| D608,688 | S* | 1/2010 | Dalzell | D11/200 |
| 10,173,733 | B2* | 1/2019 | Canner | B62D 27/065 |
| 2015/0013264 | A1* | 1/2015 | Garot | E04B 1/4121 |
| | | | | 52/699 |
| 2015/0117939 | A1* | 4/2015 | Kluge | B29C 70/72 |
| | | | | 403/299 |

FOREIGN PATENT DOCUMENTS

| | | | | |
|---|---|---|---|---|
| EP | 1 197 316 | * | 4/2002 | B29C 70/72 |
| GB | 11096812 | * | 12/1967 | F16B 11/00 |
| GB | 1181655 | * | 2/1970 | F16B 19/00 |

OTHER PUBLICATIONS

English Machine Translation of EP332495B1.
"Continuous-fiber laminate/overmolding compound combination to further plastic penetration in auto"; Plastics Today; https://www.plasticstoday.com/content/continuous-fiber-laminateovermolding-compound-combination-further-plastic-penetration-auto/71737310619047; Jun. 30, 2013; pp. 1-2.
"Square Tube Inserts—Metal, Threaded"; Components Direct; https://www.comdir.co.uk/square-tube-inserts-metal-threaded.html; printed Jan. 13, 2017; pp. 1-3.

* cited by examiner

VEHICLE COMPONENT WITH A MOUNTING COMPONENT FOR ATTACHMENT OF A FUNCTIONAL COMPONENT

TECHNICAL FIELD

This document relates to a vehicle component with a mounting element for attachment of a functional component.

BACKGROUND

In the field of the production of plastic components, it is known to integrate inserts into a plastic component by overmolding them or injection molding around them with plastic. This technology can be used, for example, to provide a connection possibility between a plastic component and a second part which can be attached to the insert. In the field of motor vehicles, this second part can be a functional component of the vehicle.

If such inserts have to withstand high mechanical loads, which can be static and dynamic, the connection region between the insert and the plastic component is normally strengthened in order to satisfy the requirements. In most cases, this is achieved in that the plastic component is embodied with a greater material thickness in these regions. However, this leads to a higher weight, higher component costs and longer production times.

In order to provide greater mechanical rigidity locally at a plastic component, it is furthermore known to attach unidirectional fiber bands for this purpose. This case involves bands composed of carbon fibers or glass fibers which run in the same direction and are sheathed with a plastic matrix (e.g. made of polypropylene or polyamide). Such fiber bands can also be used in combination with injection molding processes. For example, EP 0 332 495 B1 discloses the production of a rear spoiler for a motor vehicle, wherein an inner support frame is wrapped with fiber bands and is subsequently overmolded.

It is also known in other fields to overmold fiber bands with a plastic in order to connect them to a component. This is known, for example, in the field of zips for textiles, as U.S. Pat. No. 6,205,626 B1 describes.

Particularly in the field of attachment of functional components to a component of a motor vehicle, however, no fastening arrangements are yet available which exploit the advantages of a strengthening by unidirectional fiber bands. For example, screws are welded onto a steel girder for attachment of functional components such as crash sensors in the front region of a motor vehicle. A plastic is injection molded around the steel girder, wherein the crash sensors can subsequently be attached to the protruding screws. The steel girder offers potential for weight saving. Moreover, welding on screws represents a relatively complex production step.

With regard to the illustrated prior art, there is thus still room for improvement in the field of attachment of functional components to a vehicle component.

SUMMARY

One object is to provide a vehicle component which enables the attachment of at least one functional component in an easier manner, the vehicle component being as light as possible and withstanding high static and dynamic loads in the region of the functional component.

It should be pointed out that the features and measures listed individually in the following description can be combined with one another in any desired technically expedient manner and illustrate further configurations of the vehicle component. The description additionally characterizes and specifies the vehicle component in particular in conjunction with the figures.

The vehicle component has a mounting element to which a functional component can be attached. That mounting element has a reception region and a connection region. The reception region is formed to attach the functional component, while the connection region is attached via a fiber band to the vehicle component. The fiber band is connected to the vehicle component by overmolding and the reception region is at least partially excluded from this overmolding.

A mounting component thus comprises two functional regions, of which one is specifically formed for the attachment of a functional component, while the other is specifically formed for the connection to a vehicle component by means of an overmolded fiber band. The reception region can be formed, for example, as a hollow cylinder with an internal thread for attachment of a functional component. The material of the reception region can be in particular a metal. The functional component can be in particular a sensor and the vehicle component can be a carrier in the front region of a motor vehicle.

The fiber band is preferably a unidirectional fiber band, comprising a plurality of fibers composed of a suitable material running in the same direction. Carbon fibers or glass fibers are preferably used here which are preferably sheathed with a plastic matrix (e.g. composed of polypropylene or polyamide). The mounting element with the two functional regions and the fiber band thus form a fastening arrangement which can be premounted and then connected to a vehicle component by means of overmolding. To this end, the vehicle component can be premanufactured and injection molding around it can be performed together with the fastening arrangement. Suitable plastics, such as are normally used for injection molded parts in motor vehicles, can be used as the material for the injection molding.

To this end, the vehicle component can also be composed of plastic at least in the region of such a fastening arrangement. The fastening arrangement can, however, also be used in the case of vehicle components which are formed partially from steel or another metallic material. Injection molding around these is then performed after positioning one or more fastening arrangements.

Injection molding is carried out so that the reception region of a mounting element is at least partially excluded from the injection molding, i.e. is exposed. There is then formed in this region of the mounting element the reception region for the attachment of a functional component, which can include an internal thread. However, external threads or other fastening means can also be provided.

The connection region of the mounting element can be shaped in various ways for the attachment of at least one fiber band. In particular, the connection region is also composed of metal so that the mounting element is overall a stable metal component. The connection region is furthermore advantageously configured so that a fiber band can be guided through the connection region. In one possible embodiment, the connection region is formed by a frame with two lateral struts, which are connected to one another by at least two transverse struts. The frame is thus shaped to be substantially rectangular. One or more fiber bands can run above or below the lateral struts and/or transverse struts of the frame or even loop around these. The fiber band is preferably guided via at least one transverse strut through the frame of the connection region, wherein the transverse strut lies between the fiber band and the vehicle component. When fixing the fiber band on the vehicle component by means of injection molding, the mounting element is thus fastened to the vehicle component.

In one possible embodiment, the lateral struts of the frame between the at least two transverse struts are furthermore connected to one another via at least one connection web. The connection region thus has the form of a buckle or a slide, as known from belt technology. The reception region can be formed on this connection web. For example, the connection web can be embodied in two parts, wherein a reception region in the form of a cylindrical element is attached between its two parts.

In one possible embodiment, the reception region is located outside a plane which is spanned by the frame of the connection region. The reception region is thus preferably not located in the same plane as the frame since it would otherwise hinder or at least make it more difficult to guide the fiber band through the mounting element. In order to realize this, a connection web can be arranged between two lateral struts offset with respect to the plane of the frame so that a reception region attached to such a connection web is also located outside the plane of the frame.

In order to be able to provide a fastening arrangement, comprising at least one mounting element and at least one fiber band, which do not slip relative to one another, at least one securing element for fixing the mounting element on the fiber band can be provided at the connection region. This involves, for example, a pin, a needle or another element which is so pointed and protrudes from the connection region in such a manner that it can penetrate into the fiber band. In one possible embodiment, several such securing elements are provided on the transverse struts of a frame.

A vehicle component with a fastening arrangement which can exploit the advantages of the strengthening of regions under load by means of unidirectional fiber bands is therefore provided. A functional component can then be attached to this fastening arrangement. A special mounting element is used here in combination with unidirectional fiber bands and an overmolding process. As a result of this, for example, a steel girder in the front region of a motor vehicle can be replaced by a plastic component to which one or more functional components in the form of crash sensors can be attached.

BRIEF DESCRIPTION OF THE DRAWING FIGURES

Further advantageous configurations of the vehicle component are disclosed in the subordinate claims and the following description of the figures. In the figures FIG. 1 shows a first side view of an embodiment of a mounting element for a vehicle component according to the invention;

DETAILED DESCRIPTION

Identical parts are always provided with the same reference numbers in the various figures, which is why these are generally also only described once.

Figure 1:
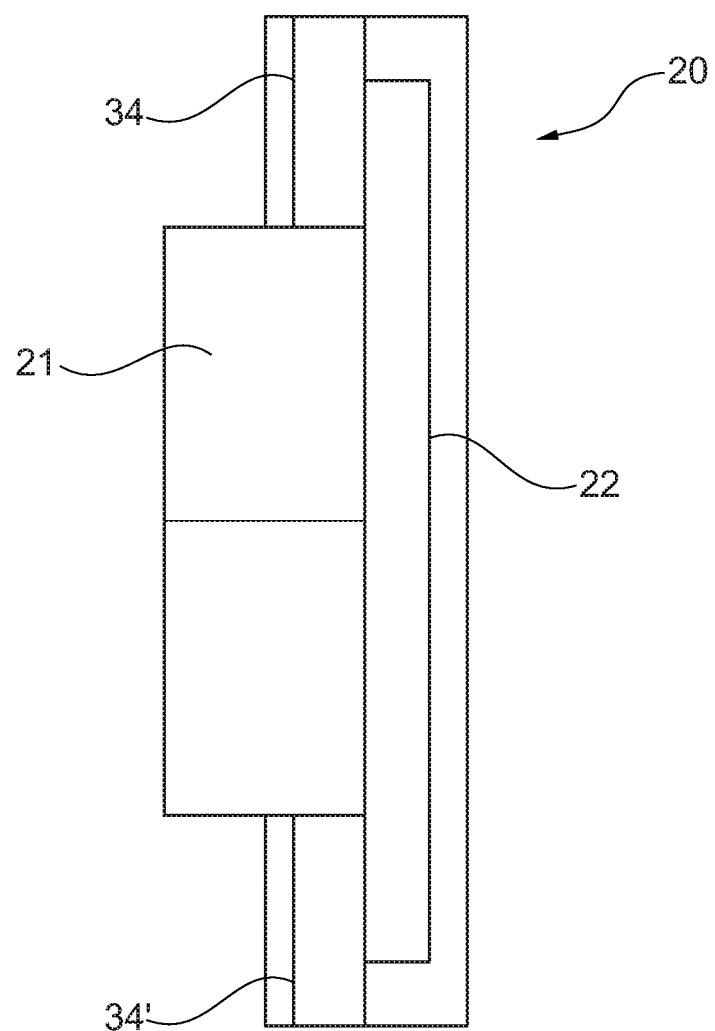

Mounting element 20 shown in FIG. 1 is suitable in conjunction with at least one unidirectional fiber band for the production of a fastening arrangement that can then be connected to a vehicle component by overmolding in an injection molding process. Mounting element 20 has a reception region 21 to which a functional component can be attached (not represented). Said reception region 21 is connected to a connection region 22 which can be connected via at least one fiber band to the vehicle component. In the exemplary embodiment of FIG. 1, a gap is present between the connection region 22 and the reception region 21, through which gap one or more fiber bands can be guided.

Figure 2:
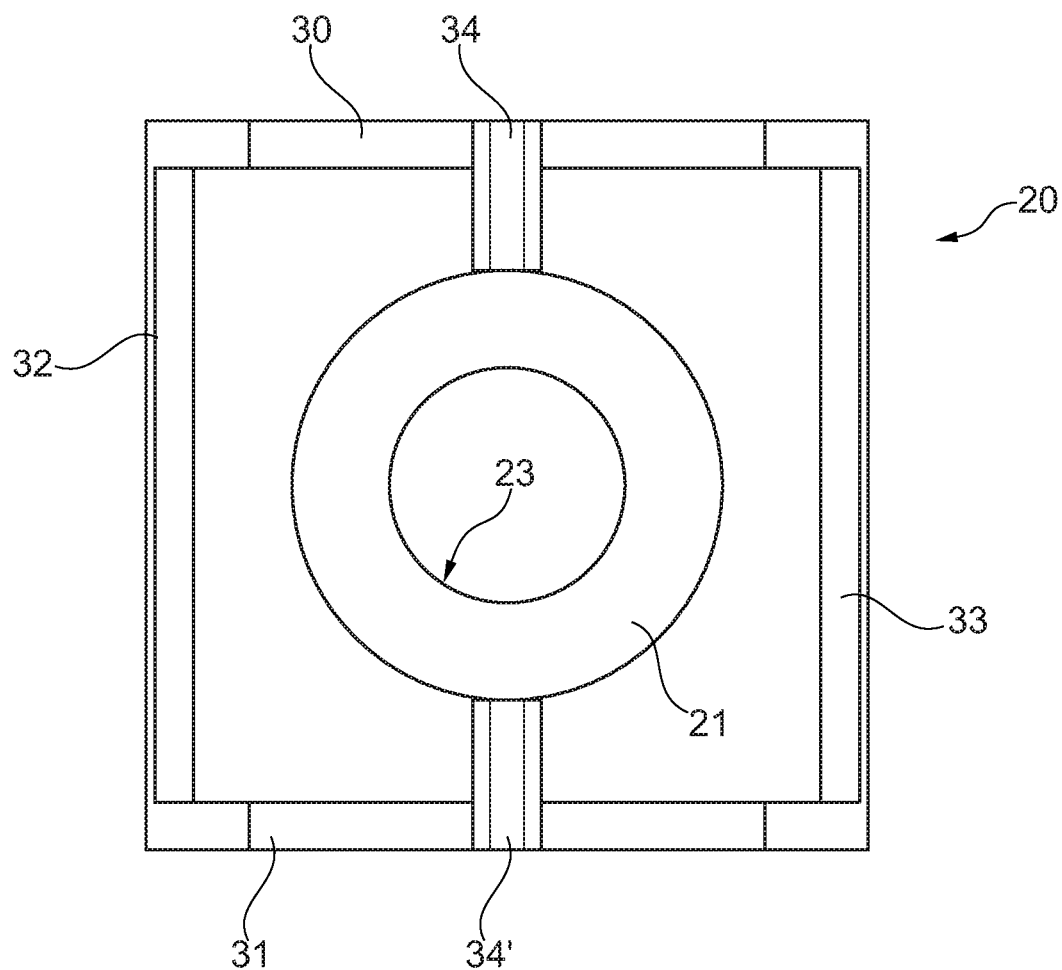
FIG. 2 shows a mounting element according to FIG. 1 in a top view.

FIG. 2 shows that connection region 22 is embodied as a frame which is formed by two lateral struts 30 and 31 which are connected to one another by two transverse struts 32 and 33. A hollow cylinder, which has an internal thread 23 on its inner side, is provided as reception region 21. A connection to a functional component can be produced via said internal thread 23 in that it is screwed into reception region 21. Reception region 21 is attached to a connection web which, in addition to the transverse struts, connects the two lateral struts 30, 31 to one another. This connection web can be embodied to be continuous, wherein the hollow cylinder of reception region 21 is placed on this connection web. The connection can, however, also be produced in two parts with two connection webs 34 and 34', as the exemplary embodiment of the figures provides.

Figure 3:
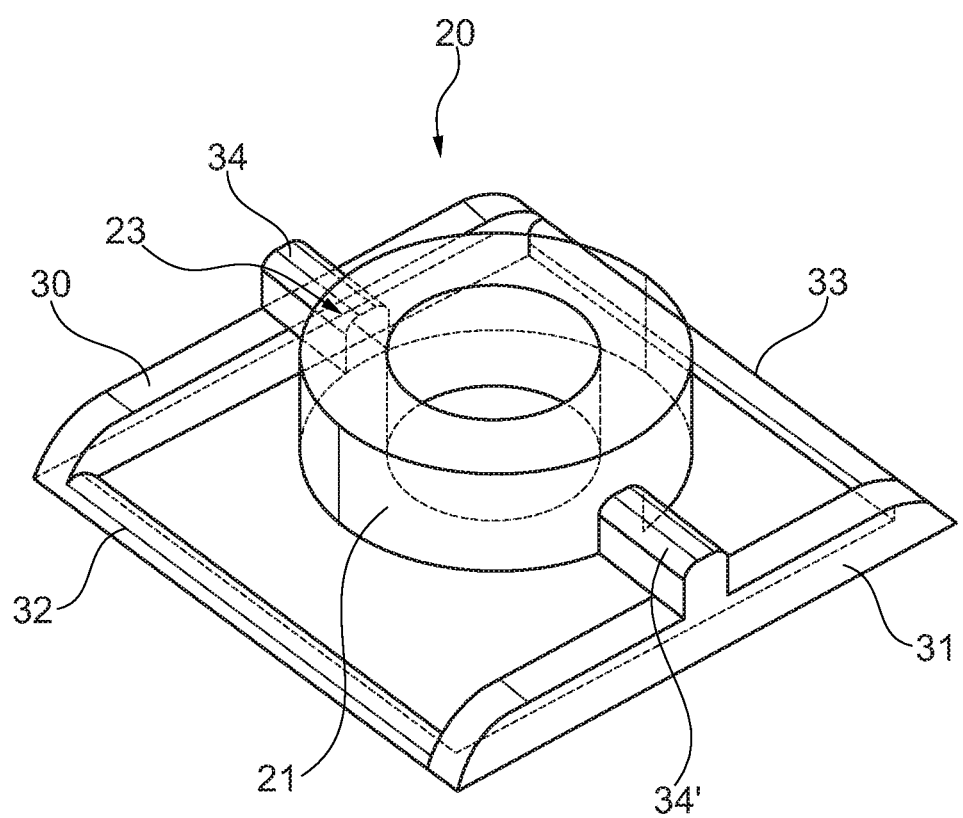
FIG. 3 shows a mounting element according to FIG. 1 in a three-dimensional view.

There can be inferred from the three-dimensional view of FIG. 3 the arrangement of connection webs 34, 34' and reception region 21 in a plane which lies above the plane of the frame which is formed by lateral struts 30, 31 and transverse struts 32, 33. The hollow cylinder of reception region 21 is attached between the two connection webs 34, 34' and projects approximately up to the upper edge of lateral struts 30, 31. The lateral struts 30, 31 can be formed to be chamfered at the ends, while transverse struts 32, 33 have a constant cross-section. In this case, transverse struts 32, 33 are thinner than lateral struts 30, 31. At least one fiber band can, as in the case of a belt buckle, thus be guided through above transverse struts 32, 33, but below reception region 21.

A reception region can also optionally be arranged at other points on the frame of the connection region. It could, for example, also be attached to one of struts 30, 31, 32 or 33. The arrangement according to the exemplary embodiment shown in the figures has, however, the disadvantage that mounting element 20 is thus shaped as a type of buckle through which at least one fiber band can be guided in a simple manner. The fiber band further holds this buckle fixedly on a vehicle component in the case of overmolding.

Figure 4:
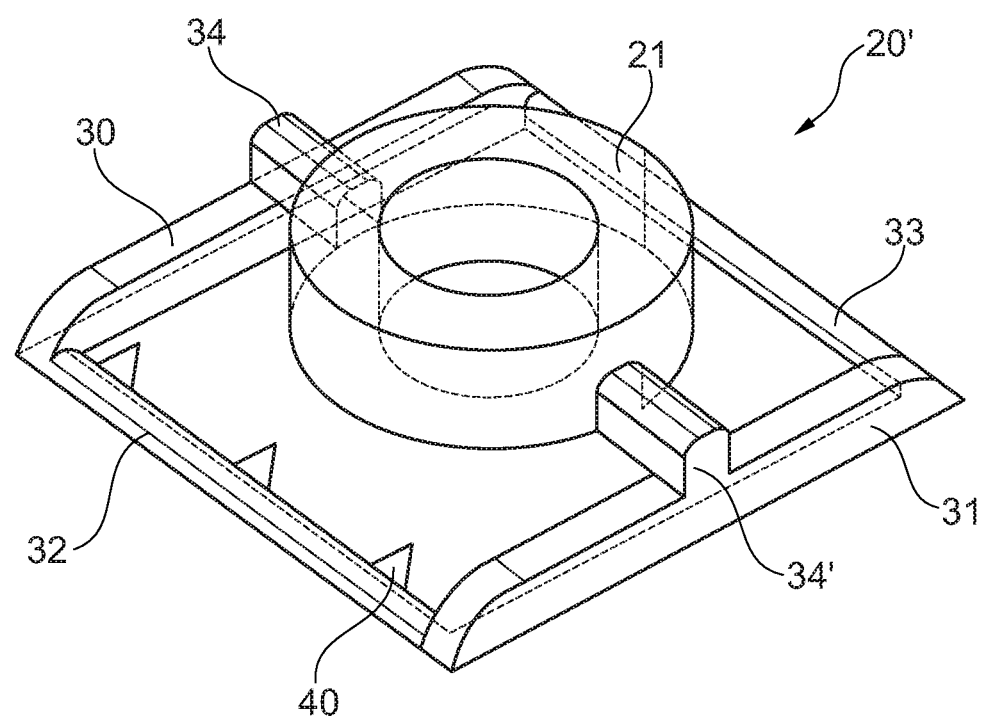
FIG. 4 shows a three-dimensional view of a mounting element with security element.

FIG. 4 shows a further exemplary embodiment of a mounting element 20' which corresponds in terms of its key structure to the exemplary embodiment of FIG. 3.

Nevertheless, securing elements are additionally provided on mounting component 20', with which securing elements a fiber band can be fixed on connection region 22. To this end, a plurality of securing elements in the form of pins 40 can be attached to at least one transverse strut 32. These are directed in the direction of reception region 21 and slightly upwards so that they can penetrate into a fiber band which is guided through above transverse struts 32, 33 and below reception region 21. Such pins could also be provided on opposite transverse struts 33 so that a fiber band could no longer be pulled out of mounting element 20'.

Figure 5:
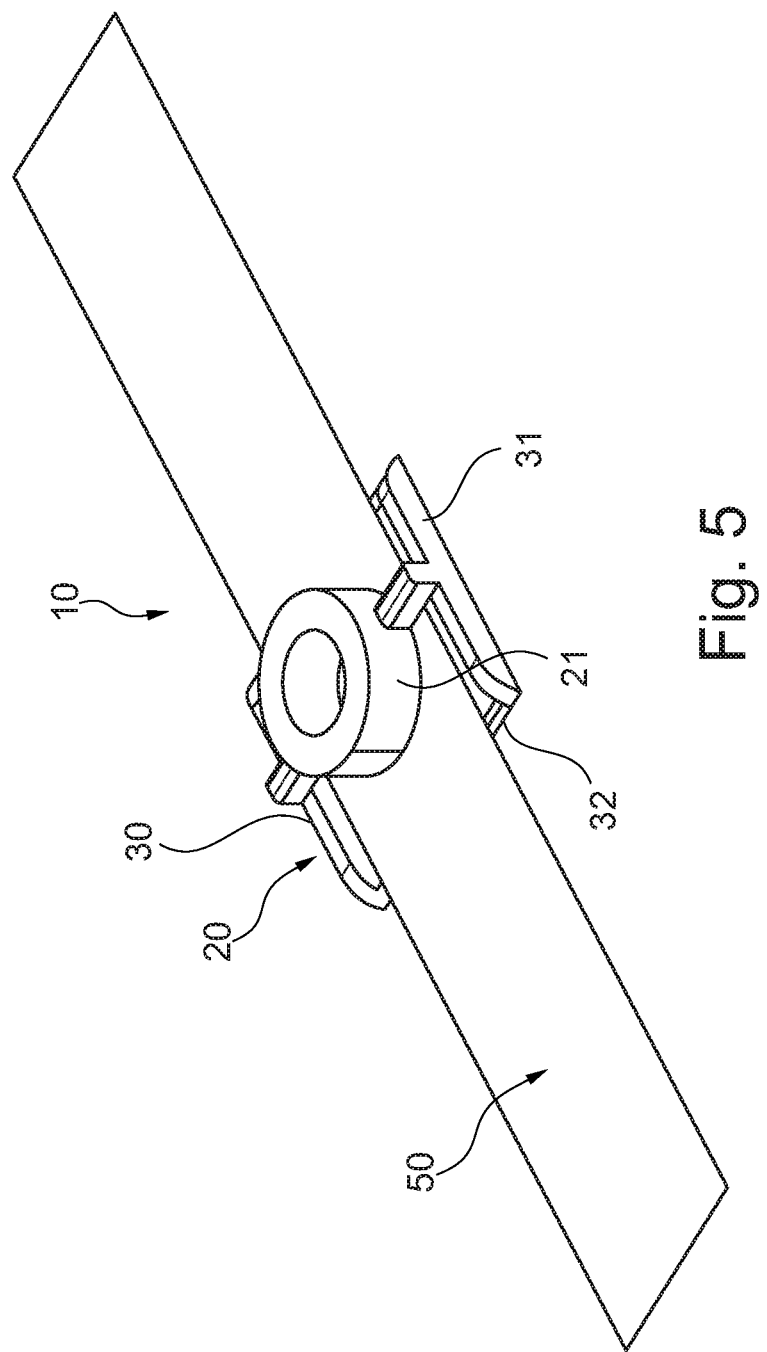
FIG. 5 shows a three-dimensional view of a fastening arrangement with mounting element and fiber band.

A fastening arrangement 10 formed in such a manner which is composed of a mounting element 20 and a fiber band 50 can be inferred from FIG. 5. Fiber band 50 is guided between the two lateral struts of the mounting element through a gap which is formed between the transverse struts and the reception region.

Figure 6:
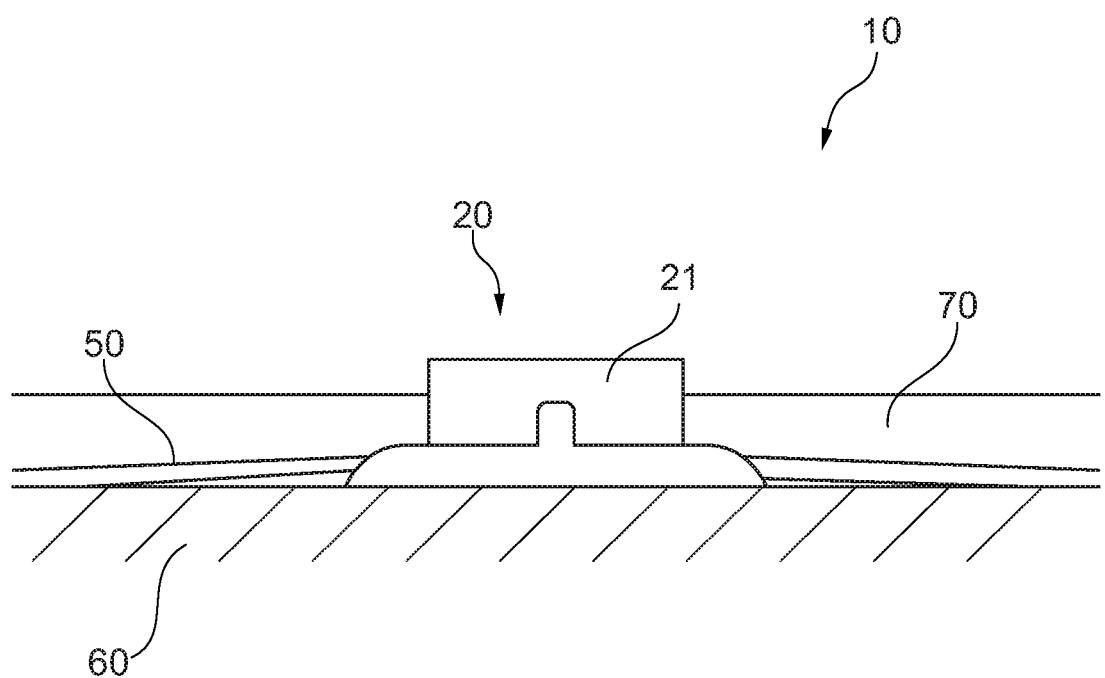
FIG. 6 shows a schematic side view of a fastening arrangement fitted onto a vehicle component.

FIG. 6 shows such a fastening arrangement 10, as it is connected to a vehicle component 60 by injection molding. The material of overmolding 70 entirely covers fiber band 50 so that it is embedded in injection molding 70. Injection molding can also be performed partially around reception region 21, but at least its internal thread remains exposed so that a connecting part of a functional component can be screwed in. Injection molding is preferably performed around the entire connection region so that the connection webs are also covered with the plastic of injection molding 70.

The invention claimed is:

1. A fastening arrangement connecting a functional component to a vehicle component, comprising:
    a mounting element including a reception region and a connection region;
    a fiber band that is received through the mounting element;
    wherein the reception region of the mounting element comprises a hollow portion including an internal thread;
    wherein the connection region of the mounting element comprises a frame having two lateral struts that are connected together by two transverse struts;
    wherein said reception region is connected to the two lateral struts between the transverse struts;
    wherein the transverse struts of the frame are positioned alone a first plane and the reception region is positioned along a second plane that is offset from the first plane such that a gap extends between the first and second planes;
    wherein the fiber band is received within an open space established by the gap, and the fiber band longitudinally extends between the transverse struts and the reception region; and
    an overmolding that secures the fastening arrangement to the vehicle component, wherein the overmolding entirely covers the fiber band and the frame but only partially covers the reception region of the mounting element such that the internal thread of the reception region is exposed outside of the overmolding; and
    the functional component being attached to the internal thread of the reception region.

2. The fastening arrangement of claim 1, further including at least one connection web connecting said two lateral struts between said at least two transverse struts.

3. The fastening arrangement of claim 2, wherein said reception region is carried on said at least one connection web.

4. A vehicle, comprising:
    a vehicle component;
    a fastening arrangement secured to the vehicle component, comprising a mounting element that includes a reception region and a connection region, and a fiber band that is received through the mounting element;
    wherein the reception region of the mounting element comprises a hollow portion including an internal thread;
    wherein the connection region of the mounting element comprises a frame having two lateral struts that are connected together by two transverse struts;
    wherein said reception region is connected to the two lateral struts between the transverse struts;
    wherein the transverse struts of the frame are positioned along a first lane and the reception region is positioned along a second plane that is offset from the first plane such that a gap extends between the first and second planes;
    wherein the fiber band is received within an open space established by the gap, and the fiber band longitudinally extends between the transverse struts and the reception region;
    an overmolding that secures the fastening arrangement to the vehicle component, wherein the overmolding entirely covers the fiber band and the frame but only partially covers the reception region of the mounting element such that the internal thread of the reception region is exposed outside of the overmolding; and
    a sensor attached to the internal thread of the reception region.

5. The vehicle of claim 4, wherein the vehicle component is a plastic carrier located at a front region of the vehicle.

6. The vehicle of claim 4, wherein the fiber band is a unidirectional fiber band that includes a plurality of carbon or glass fibers that are sheathed within a plastic matrix.

7. The vehicle of claim 4, wherein the sensor is a crash sensor.

8. The vehicle of claim 4, wherein the reception region includes a hollow cylinder that includes the internal thread.

9. The vehicle of claim 4, comprising a connection web that connects the reception region to one of the two lateral struts of the frame.

10. The vehicle of claim 4, comprising at least one pin or needle that protrudes from one of the transverse struts of the frame of the connection region for securing a positioning of the mounting element relative to the fiber band.

* * * * *

UNITED STATES PATENT AND TRADEMARK OFFICE
CERTIFICATE OF CORRECTION

PATENT NO. : 10,611,318 B2
APPLICATION NO. : 15/421908
DATED : April 7, 2020
INVENTOR(S) : Thomas Baranowski, Maik Broda and Florian Golm It is certified that error appears in the above-identified patent and that said Letters Patent is hereby corrected as shown below:

In the Claims

In Claim 1, Column 5, Line 38-39; replace "are positioned alone" with --are positioned along--

Signed and Sealed this
First Day of March, 2022

Drew Hirshfeld
*Performing the Functions and Duties of the*
*Under Secretary of Commerce for Intellectual Property and*
*Director of the United States Patent and Trademark Office*